United States Patent [19]
Ikegame

[11] Patent Number: 6,008,924
[45] Date of Patent: Dec. 28, 1999

[54] GALVANOMIRROR MOUNTING APPARATUS

[75] Inventor: Tetsuo Ikegame, Hachioji, Japan

[73] Assignee: Olympus Optical Co., Ltd., Tokyo, Japan

[21] Appl. No.: 09/236,514

[22] Filed: Jan. 25, 1999

[30] Foreign Application Priority Data

Jan. 27, 1998 [JP] Japan .................................. 10-013968

[51] Int. Cl.⁶ .................................................. G02B 26/08
[52] U.S. Cl. .......................... 359/198; 359/199; 359/213; 359/214; 359/223
[58] Field of Search ............................ 359/196, 198–200, 359/212–214, 223, 224; 346/107.3; 369/119; 310/36, 40 R, 66, 67 R, 91, 261

[56] References Cited

U.S. PATENT DOCUMENTS

| | | | |
|---|---|---|---|
| 5,249,173 | 9/1993 | Tanaka | 359/223 |
| 5,737,302 | 4/1998 | Kasahara | 369/118 |
| 5,920,140 | 7/1999 | Nakagishi et al. | 310/219 |

FOREIGN PATENT DOCUMENTS 2536274  2/1997  Japan .

*Primary Examiner*—James Phan
*Attorney, Agent, or Firm*—Frishauf, Holtz, Goodman, Langer & Chick, P.C.

[57] ABSTRACT

A supporting surface is formed on a portion of a base member of a galvanomirror in a direction parallel to the reflection surface of a mirror. A galvanomirror container section opened in a direction parallel to the reflection surface is formed in a carriage and a bearing seat surface is formed inside the galvanomirror container section. The center axes of the supporting surface and of the bearing seat surface are aligned to the direction parallel to the reflection surface. Only by inserting the galvanomirror into the galvanomirror container section from the direction parallel to the reflection surface, the supporting surface abuts on the bearing seat surface 29. As a result, a mounting apparatus for mounting the galvanomirror 20 into the carriage 2 while adjusting the inclination of the reflection surface can be made small and the structure thereof can be simplified.

6 Claims, 7 Drawing Sheets

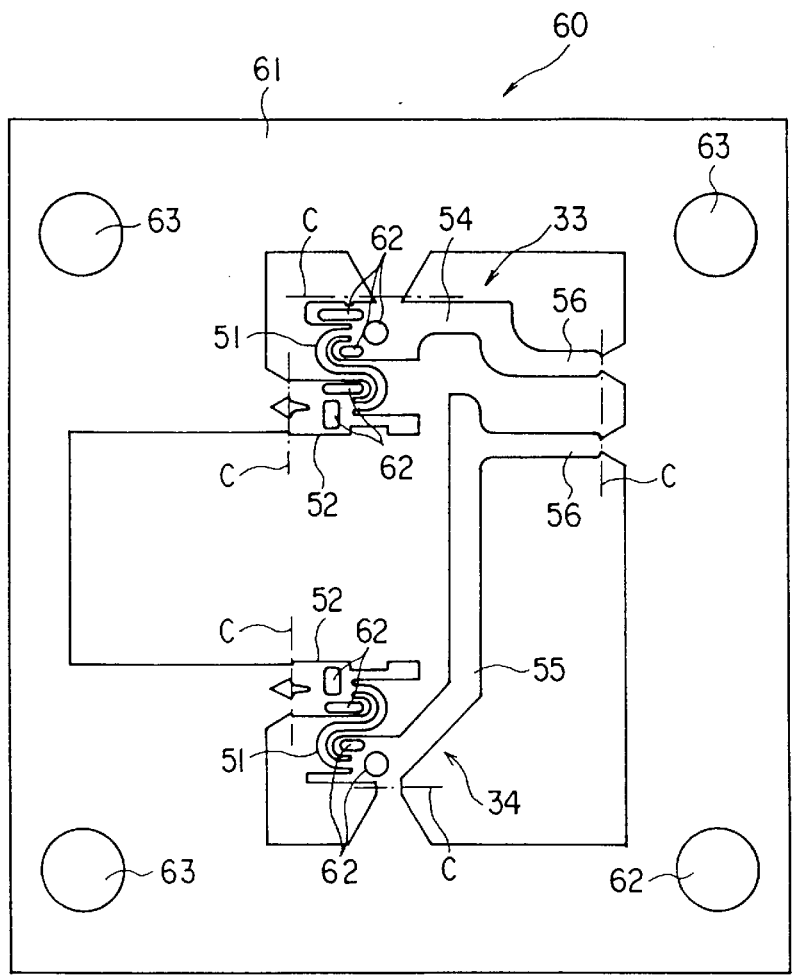
FIG. 7
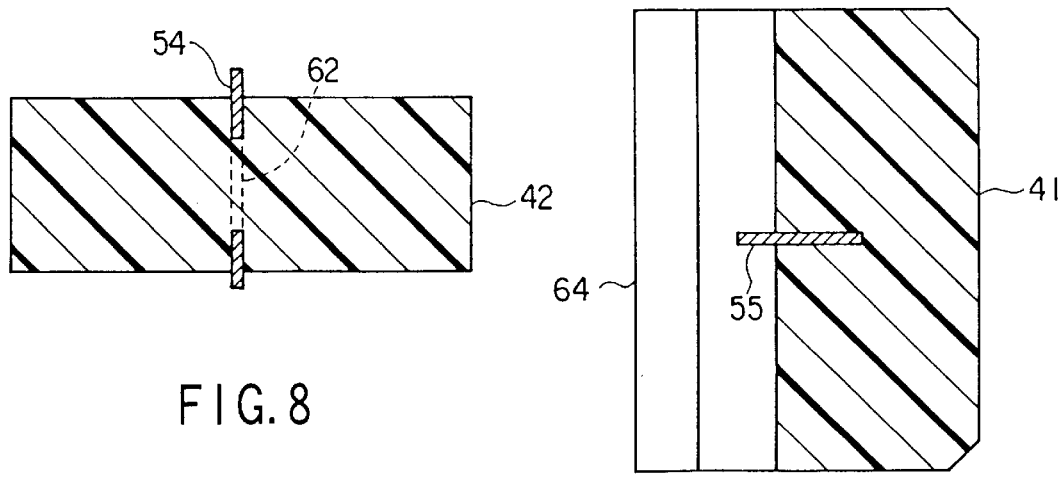
FIG. 8
FIG. 9

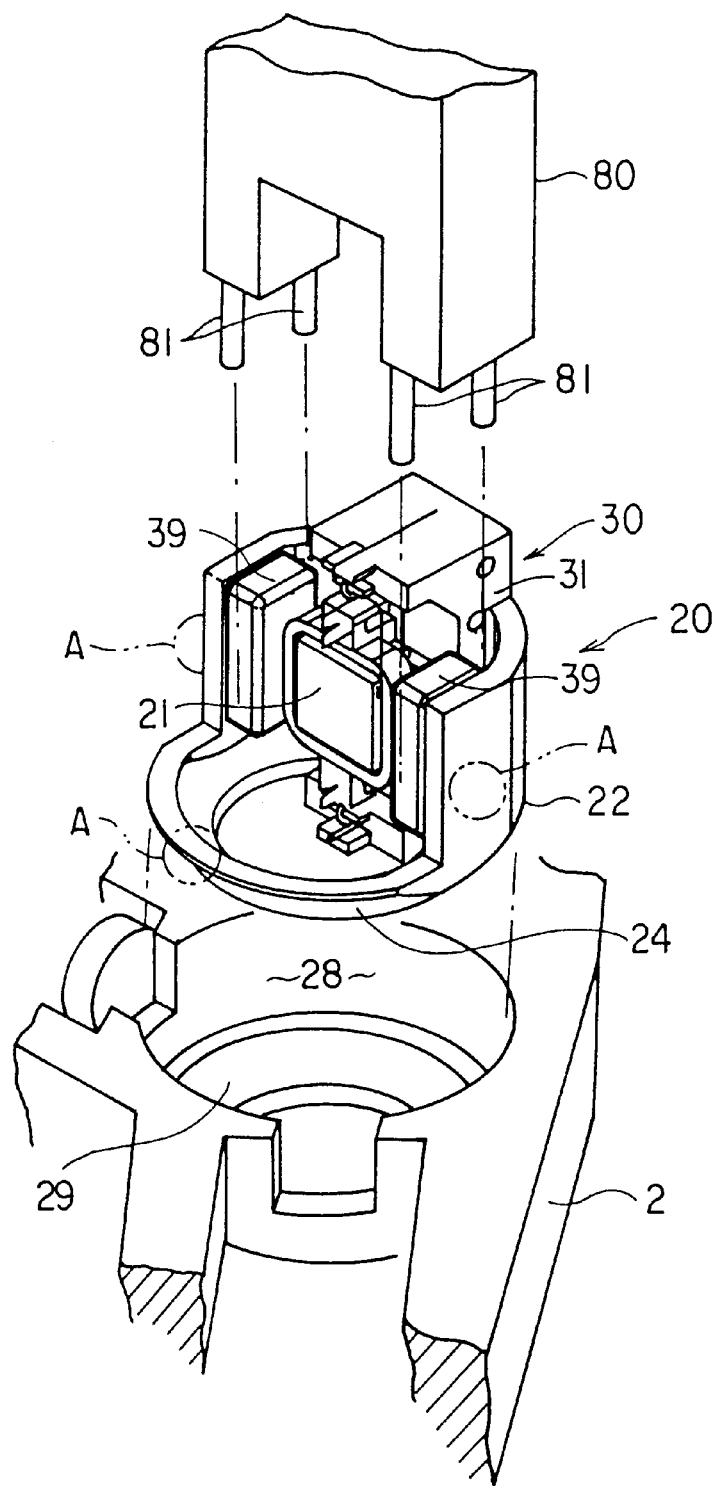
F I G. 12 us 6,008,924

GALVANOMIRROR MOUNTING APPARATUS

BACKGROUND OF THE INVENTION

The present invention relates to a mounting apparatus for mounting a mirror-type deflection apparatus, i.e., a galvanomirror which controls the direction of a luminous flux used in an optical device such as an optical scanner or the like or used in a data recording/reproducing apparatus which records/writes data with respect to an optical recording medium such as an optical disk drive, postscript type disk drive, phase change disk drive, CD-ROM, DVD, optical card, or the like, by adjusting the inclination of the mirror-type deflection apparatus with respect to a fixed member to which the deflecting apparatus is mounted.

Conventionally, a small-size galvanomirror is used in various types of optical devices stated above. If the galvanomirror is mounted to the optical device of this type, it is required to adjust the inclination or the like of the mirror with respect to the light axis of entering light or the like and to accurately position the mirror. As a mounting apparatus for mounting the galvanomirror with the inclination of the mirror adjusted, various types of apparatuses are used. Since the above-stated optical device is strictly required to be small, a mounting apparatus provided with a spherical supporting surface is often used.

According to this mounting apparatus, a spherical supporting surface is formed on the main body, that is, on the base member of the galvanomirror and a bearing seat surface of, for example, spherical shape which abuts on the supporting surface is formed at a fixed member such as a carriage and a frame to which the galvanomirror is mounted. While the supporting surface abutting on the bearing seat surface, the galvanomirror is fixed. During or after mounting, the supporting surface is slid with respect to the bearing seat surface, thereby adjusting the inclination of the galvanomirror in an arbitrary direction, such as, about two axes perpendicular to each other and thereafter fixing the galvanomirror. The mounting apparatus of this type is simple in structure and can be made small, so that the apparatus is appropriate as a small-size galvanomirror mounting apparatus for the optical device stated above.

The front surface side of the galvanomirror serves as an optical path of the optical device. Obviously, therefore, the mounting apparatus cannot be arranged on the front surface side of the galvanomirror. For that reason, the conventional galvanomirror mounting apparatus is provided on the back surface of the mirror.

According to a galvanomirror apparatus disclosed by Jpn. UM Registration Publication No. 2536274, a spherical abutment portion is formed on the back surface of the yoke of the galvanomirror and a concave portion is formed on the front surface of a retainer. The abutment portion abuts on the concave portion, thus fastening the yolk and the retainer using three adjusting screws. In addition, the retainer is structured to be attached to the side surface of the vertical wall portion of a housing. While loosening the adjusting screws, the abutment portion is slid to the concave portion and the angle and position of the mirror are adjusted. Thereafter, the adjusting screws are fastened to thereby fix the yoke.

The conventional structure stated above, however, has the following drawbacks. That is, the housing and the like of the optical device are, in many cases, manufactured integrally by, for example, die-casting and a container section into which the optical components such as the galvanomirror are inserted and mounted is, in many cases, formed to be opened in the direction perpendicular to or crossing the optical path of the optical device. Due to this, if the abutment portion for adjusting the mounting position is formed on the back surface side of the galvanomirror as stated above, the retainer or the like is required to be mounted on the side surface of the vertical wall portion of the container section of the housing.

Due to the need to make the housing of the optical device small, the dimensions of the container section cannot have allowance for the outer dimensions of the optical components to be contained in the container section. Owing to this, after inserting the galvanomirror into such a narrow container section, the galvanomirror has to be mounted on the side surface of the vertical wall portion of the housing while adjusting the position. Thus, working efficiency greatly, disadvantageously deteriorates.

Furthermore, to provide a small-size apparatus, it is preferable that the concave portion is directly formed in the inner surface of the housing, that the galvanomirror-side abutment portion abuts on the concave portion and that the galvanomirror is directly mounted in the housing. Nevertheless, the housing is normally manufactured by die-casting as stated above. The concave portion cannot be, therefore, formed on the side surface of the vertical wall portion, that is, the metal mold leaving direction.

For those reasons, there is no choice but to adopt the structure in which the retainer is provided, a concave portion is provided at the retainer and the retainer is attached on the side surface of the vertical wall portion of the housing as in the above-stated conventional technique. As a result, the resultant structure is complicated, the number of parts increases, the dimensions of the mounting structure become greater, and the optical device is disadvantageously prevented from being made smaller.

BRIEF SUMMARY OF THE INVENTION

In the above circumstances, the present invention has been made and the object of the present invention is to provide a galvanomirror mounting apparatus which is simple in structure, can be made small and requires less difficult mounting and adjustment operation.

To obtain the above object, a galvanomirror mounting apparatus for fixing a galvanomirror, the galvanomirror comprising a base member, a movable section rotatably supported about a mirror rotation axis with respect to the base member and having at least a mirror and drive means for rotating the movable section, to a fixed member by adjusting an inclination in at least two directions about the axis, parallel to a reflection surface of the mirror and perpendicular to each other, wherein a supporting surface having a center axis parallel to the reflection surface of the mirror is provided on a bottom, an upper or side surface of the base member positioned in a direction parallel to the reflection surface of the mirror; a galvanomirror container section opened toward a direction parallel to the reflection surface of the mirror and containing the galvanomirror is provided at the fixed member; a bearing seat surface having a center axis parallel to the reflection surface of the mirror is provided in the galvanomirror container section; and the galvanomirror mounting apparatus comprises galvanomirror fixing means for fixing the galvanomirror while the supporting surface of the base member of the galvanomirror abuts on the bearing seat surface of the galvanomirror container section.

Therefore, the direction of the opening of the galvano container section, the center axis of the supporting surface and the center axis of the bearing seat surface are aligned in the direction parallel to the reflection surface of the mirror, that is, the direction perpendicular to or crossing the optical path. Thus, only by inserting the galvanomirror into the galvanomirror container section from this opening, the supporting surface abuts on the bearing seat surface. If the galvanomirror is pressed in the opening direction, that is, insertion direction, the supporting surface keeps abutting on the bearing seat surface. In this state, if the supporting surface and bearing seat surface are slid, the inclination of the galvanomirror in at least two directions can be adjusted. As a result, mounting operation is made easier and efficient.

In addition, since the supporting surface can directly abut on the bearing seat surface as stated above, there is no need to interpose a member such as a retainer therebetween as in the case of the conventional technique. As a result, the structure of the mounting apparatus can be simplified, the number of parts can be reduced and the apparatus can be made smaller.

Moreover, since the direction of the bearing seat surface on the fixed member side corresponds to the opening direction of the galvanomirror container section, the bearing seat surface can be easily manufactured during die-casting molding and can be easily mechanically processed by inserting a cutting tool from the opening, thereby greatly facilitating the manufacture of the fixed member.

According to a preferred embodiment, the galvanomirror mounting apparatus is characterized in that the center axis of the supporting surface is parallel to the mirror rotation axis. The mirror rotation axis normally corresponds to the center axis of the assembly of the galvanomirror, so that the galvanomirror can be mounted by inserting it in the center axis direction, thus facilitating mounting operation.

In addition, according to a preferred embodiment, the galvanomirror mounting apparatus is characterized in that the center axis of the supporting surface is included in the reflection surface of the mirror and parallel to the mirror rotation axis. Therefore, even if the supporting surface is rotated about the center axis thereof with respect to the bearing seat surface on the fixed member side to thereby adjust the inclination, the reflection surface of the mirror is not displaced toward the direction perpendicular to the center axis. Thus, mounting and adjustment operation can be carried out more easily with higher accuracy.

Further, according to a preferred embodiment, the galvanomirror mounting apparatus is characterized in that a center of an inclination of supporting surface corresponds to a position of an optical axis of entering light on the reflection surface of the mirror. Therefore, even if the spherical supporting surface is slid with respect to the bearing seat surface in an arbitrary direction to thereby adjust the inclination, the reflection surface of the mirror is not displaced with respect to the optical axis of entering light. Thus, mounting operation can be carried more easily with higher accuracy.

In addition, according to a preferred embodiment, the galvanomirror mounting is characterized in that the galvanomirror fixing means is an adhesive material fixedly attaching the base member to the fixed member. Therefore, the galvanomirror held by, for example, a mounting adjusting holder is inserted into the galvanomirror container section and the inclination thereof is adjusted while the supporting surface abutting on the bearing seat surface. Thereafter, the galvanomirror is fixed to the fixed member by the above-mentioned adhesive material. As a result, the galvanomirror can be mounted easily and surely. Besides, no other member is not needed for fixing operation, thereby making the structure of the apparatus simple and small.

Furthermore, according to a preferred embodiment, the galvanomirror mounting apparatus is characterized in that the galvanomirror comprises a movable coil provided at the movable section, a cantilever-like supporting member rotatably supporting the movable section and a pair of fixed magnets arranged on both sides of the movable section; the base member is a cylindrical member having a bottom, the base member having an upper end portion opened and a bottom wall portion at the bottom; a yoke member and the pair of fixed magnets are inserted into and fixed to the cylindrical base member having the bottom in predetermined arrangement; a portion of a circumferential wall portion of the base member corresponding to the front side of the mirror is cut to thereby form an optical path opening; and a cylindrical supporting surface having a center axis parallel to the mirror rotation axis is provided on a lower surface of the bottom wall portion.

Therefore, the cylindrical base member having a bottom serve both as a frame for incorporating the respective components constituting the galvanomirror in predetermined positions and as a base for forming the supporting surface. Due to this, the number of parts can be reduced and the structure can be simplified.

Further, the member supporting the movable section is a cantilever-like supporting member and is contained in the cylindrical base member and an optical path opening is formed on the front side of the base member. As a result, the galvanomirror can be made compact and smaller.

BRIEF DESCRIPTION OF THE SEVERAL VIEWS OF THE DRAWING

The present invention will be understood more clearly from the drawings below integrated as a part in the present specification, the explanation above in the brief summary of the invention, and the detailed description of preferred embodiment described below.

FIG. 7 is a plan view of a blank material of a spring according to the embodiment.

FIG. 8 is a cross-sectional view cut along a line 8—8 in FIG. 6.

FIG. 9 is a cross-sectional view cut along a line 9—9 in FIG. 6.

FIG. 12 is an exploded perspective view showing an installation state of the galvanomirror.

DETAILED DESCRIPTION OF THE INVENTION

In the following, one embodiment of the present invention will be described with reference to the accompanying drawings. This embodiment illustrates a case where, in a light pick-up device in a data recording/reproducing apparatus using a magneto-optical disk as a recording medium, a galvanomirror is adjustably mounted to a fixed member, i.e., a carriage of the device.

Figure 1:
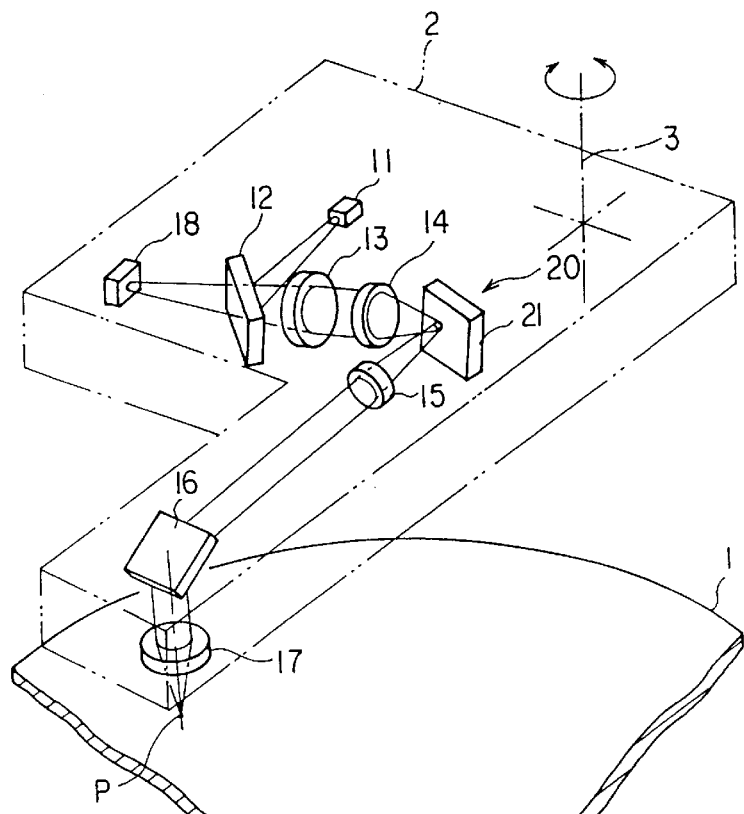
FIG. 1 is a schematic perspective view showing the structure of a light pick-up apparatus according to an embodiment of the present invention.

First, the schematic layout of the optical element in the light pick-up device will be explained with reference to FIG. 1. In FIG. 1, reference numeral 1 denotes a magneto-optical disk, and an arm-like carriage 2 is provided along the recording surface of the magneto-optical disk 1. In the carriage 2, an optical system described later is provided, and a light spot P is focused on the recording surface of the magneto-optical disk 1 by the optical system, to perform writing and reading of data.

The carriage 2 described above is rotated by a drive mechanism (not shown), about the rotation shaft 3 as a center, and the top end portion thereof is mechanically moved to make coarse access. The optical system is provided with a galvanomirror 20 described later, and the spot P is optically moved to perform fine tracking.

Although no specific structure is shown in the figure, the carriage 2 described above is formed by die-cast molding of magnesium alloy or plastics, and the above optical system is included internally therein. Note that the carriage 2 may be formed by die-cast molding of aluminum alloy or plastics such as polyphenylene sulfide (PPS), liquid crystal plastics (LCP), polyether imide (PEI) or the like, other than die-cast of magnesium alloy described above. This optical system comprises a laser diode 11 as a light source, and a part of light emitted therefrom is reflected on the surface of a beam splitter 12. The reflection light therefrom enters into a collimator lens 13 and becomes parallel light. Further, the parallel light is converged by a relay lens 14. Also, this optical system is provided with a galvanomirror 20 described later. The light converged by the relay lens 14 is reflected at a position slightly before the focus position thereof by a mirror 21 of the galvanomirror 20, and is changed into parallel light again by a conversion lens 15. The parallel light travels in the arm portion of the carriage 2 along the lengthwise direction thereof, and is reflected by a fixed mirror 16 provided at the top end portion of the arm portion. The reflection light enters into an objective lens 17 and focuses the light spot P described above, on the recording surface of the magneto-optical disk 1.

In addition, a part of returning light from the recording surface of the magneto-optical disk 1 is transmitted through the beam splitter 12 and enters into a photo-detector 18. Further, a signal such as a data reproducing signal, a focusing error signal, a tracking error signal, or the like is obtained by an output from this photo-detector 8. For example, the focusing error signal, tracking error signal or the like are supplied to a control circuit (not shown), of the light pick-up device. By a control signal from the control circuit, the mirror 21 of the galvanomirror 20 is rotated about the mirror rotation shaft thereby to move the position of the light spot P in the tracking direction so that fine tracking described above is carried out. Also, by the control signal from the control circuit, the relay lens 14 is rotated in its optical axis direction by a drive mechanism (not shown), thereby to make focusing control of the light spot P on the magneto-optical disk 1.

In the present embodiment, each of the light paths from the laser diode 11 to the fixed mirror 16 and to the photo-detector 18 is arranged in the plane parallel to the rotation plane of the carriage 2.

Figure 2:
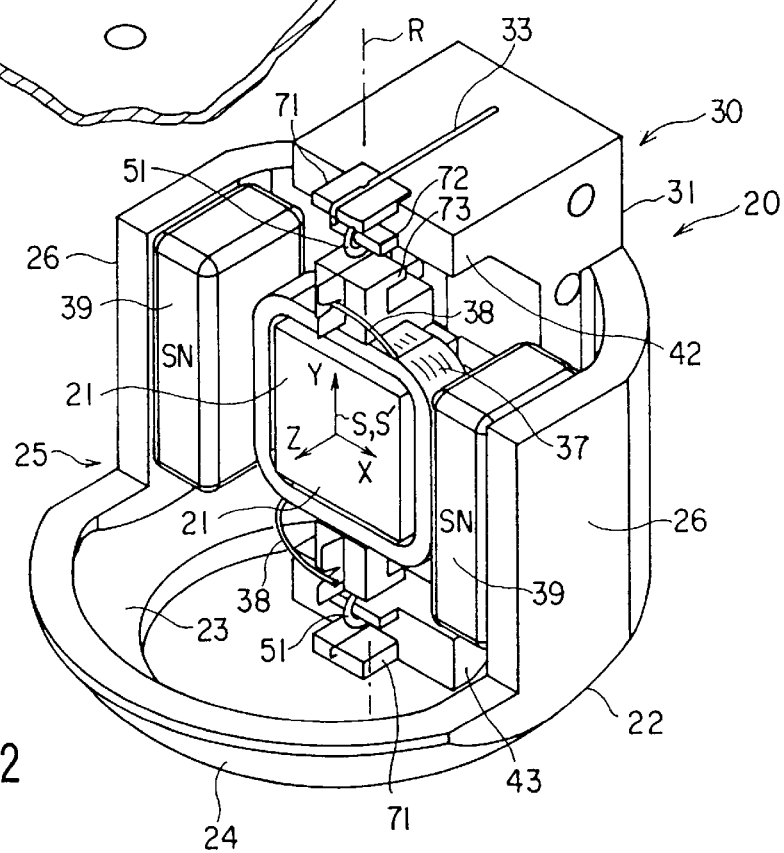
FIG. 2 is a perspective view of a galvanomirror according to the embodiment, viewed from the front side.
Figure 3:
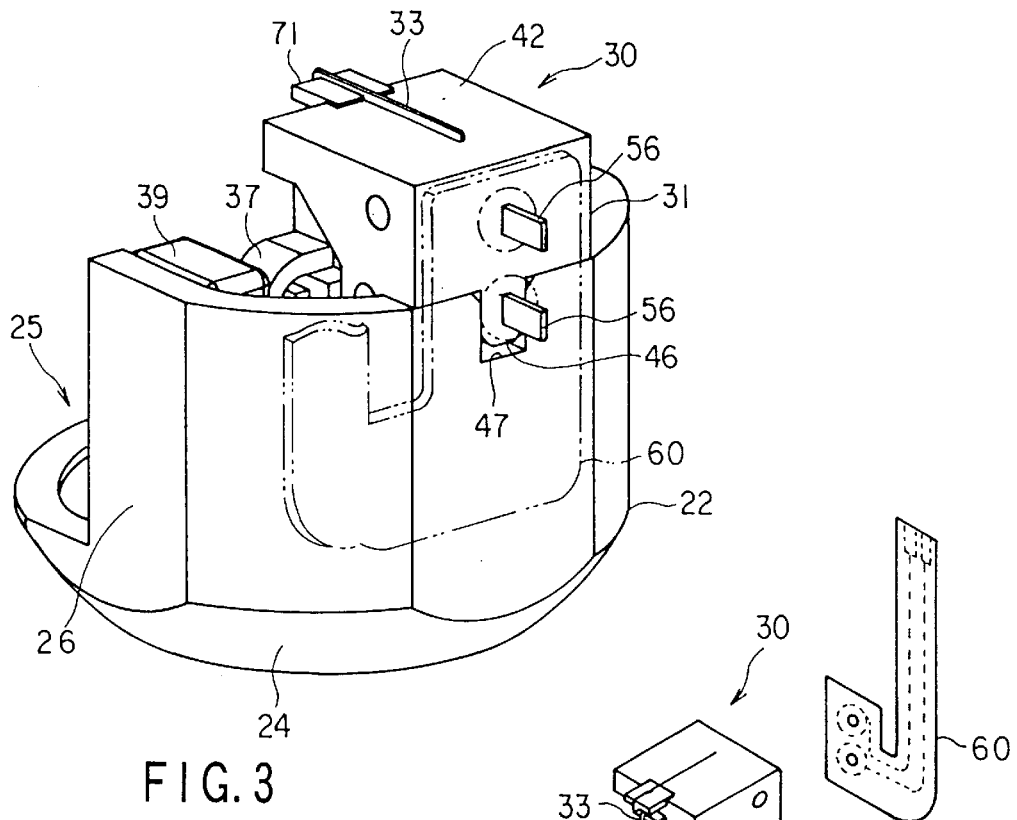
FIG. 3 is a perspective view of the galvanomirror according to the embodiment, viewed from the rear side.
Figure 4:
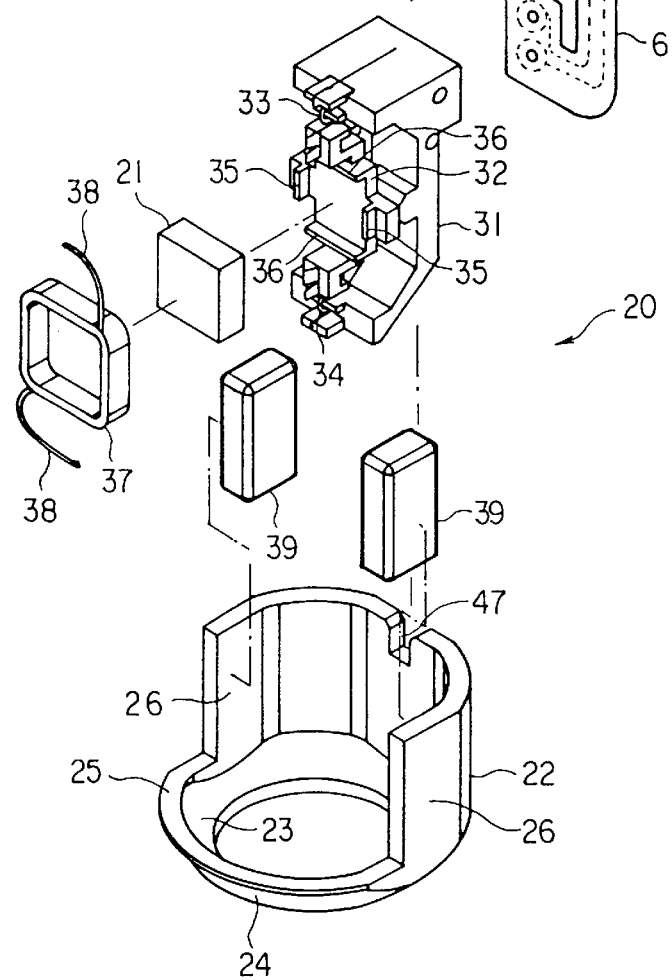
FIG. 4 is an exploded perspective view of the galvanomirror according to the embodiment.

Next, explanation will be made of the structure of the galvanomirror 20 used in the light pick-up device of the present embodiment. FIG. 2 is a perspective view of the galvanomirror of this embodiment viewed from the front side. FIG. 3 is a perspective view thereof from the backside. FIG. 4 is an exploded perspective view thereof.

In the figure, reference numeral 22 denotes a base member, and this base member 22 is formed by press-molding a steel plate material and has a substantially cylindrical shape having a bottom, as a whole. A hole is formed in the central portion of the bottom wall portion 23 of the base member 22 thereby forming a ring-like shape, and the lower surface of the bottom wall portion 23 is formed to be spherical as a supporting surface 24 for mounting and adjusting the galvanomirror. The center of the sphere of the supporting surface 24 corresponds to the position O of the light axis of the entering light on the reflection surface of the mirror 21. Among the circumferential walls of the base member 22, the front surface side of the mirror 21 is notched so that a light path opening 25 is formed for passing light through the opening 25.

Figure 11:
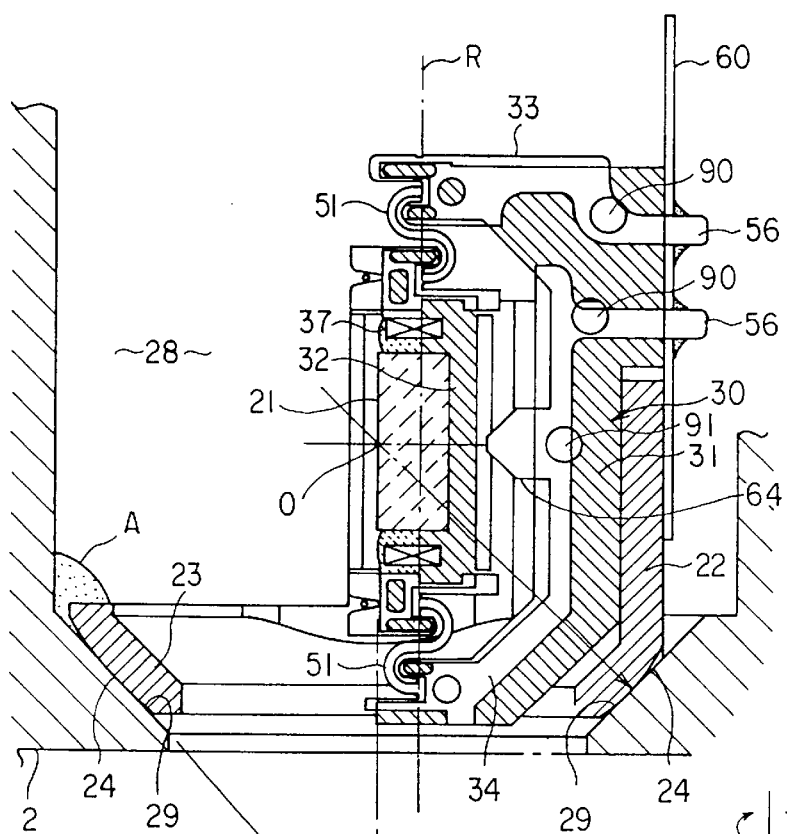
FIG. 11 is a longitudinal sectional view of a galvanomirror container section and the galvanomirror contained therein.

The galvanomirror 20 as described above is contained in a galvanomirror container section 28 formed in the carriage 2, as shown in FIGS. 11 and 12. This galvanomirror container section 28 has a shape substantially corresponding to the outer shape of the galvanomirror 20 as described above, i.e., a circular concave portion. The galvanomirror container section 28 is opened in the direction vertical to the plane where the light paths in the carriage 2 are provided, e.g., toward the upside. The opening direction of the galvano container section 28 is also the leaving direction when the carriage 2 is subjected to die-cast molding with a metal mold.

Further, a ring-like bearing seat surface 29 is formed on the bottom portion of the galvanomirror container section 28. The bearing seat surface 29 is integrally formed when the carriage 2 is molded by die-casting, and has a shape like a conical surface. Further, the galvanomirror 20 inserted in the galvanomirror container section 28 is adjusted, with the supporting surface 24 at the bottom kept in contact with the bearing seat surface 29, and the galvanomirror 20 is fixed at a predetermined position.

The center axis S of the supporting surface 24 of the galvanomirror 20 and the center axis S' of the bearing seat surface 29 are each arranged in parallel with the mirror rotation axis R which is the rotation center axis of the mirror 21. In addition, the center axes S and S' of these supporting surface 24 and the bearing seat surface 29 are included in the reflection surface of the mirror 21 and are arranged so as to pass the position of the optical axis of the entering light on the reflection surface.

Further, a spring assembly 30 is contained in the base member 22. This spring assembly 30 is comprised of a fixing member 31 as a member on the fixed side, which is made of synthetic resin material in a cantilever-like shape, and a movable member 32 which is made of synthetic resin material and is supported to be rotatable on the front side of the fixed member 31. The movable member 32 is supported to be rotatable about the mirror rotation axis R parallel to the Y axis as shown in FIG. 2 by springs 33 and 34 described later.

Also, a mirror 21 is attached to the front surface of the movable member 32, and a substantially rectangular movable coil 37 is equipped so as to surround the mirror 21. A movable section is formed by the movable member 32, the mirror 21, the movable coil 37 and the like. The light path of the entering light which enters into and the mirror 21 and that of the reflection light which reflected on the mirror 21 are arranged in a plane which includes the X-axis and Z-axis in FIG. 2. The mirror rotation axis R described above is parallel to the Y-axis as described above and passes the gravity center point of the entire movable section consisting of the movable member 32, the mirror 21, the movable coil 37 and the like. The mirror rotation axis R corresponds to the main axis of inertia of the movable section.

Note that total four projections consisting of a pair of left and right positioning projecting portions 35 and a pair of upper and lower positioning projecting portions 36 are integrally projected on the front surface of the movable member 32. Further, the left and right side surfaces and the upper and lower surfaces of the mirror 21 are engaged with the inner surfaces of the positioning projecting portions 35 and 36, and the mirror 21 is positioned at a predetermined position on the front surface of the movable member 32. In addition, the movable coil 37 has left, right, upper and lower inner circumferential surfaces engaged with the outer surfaces of the positioning projecting portions 35 and 36, and the movable coil 37 is positioned at a predetermined position. Therefore, the positioning projecting portions 35 and 36 are interposed between the outer circumference of the mirror 21 and the inner circumference of the movable coil 37, and a predetermined clearance is formed therebetween.

Further, the movable member 32, the mirror 21, and movable coil 37 integrally adhere to one another by an adhesive material filled in the clearance. Accordingly, the movable section consisting of these components has a rectangular block-like shape as a whole and those component are also integrally joined to one another by an adhesive material. Therefore, the oscillation frequency inherent to the movable section is very high, and resonance generated when the movable section rotates is securely prevented.

Note that the fixed member 31 and the movable member 32 are formed of a non-conductive synthetic resin material reinforced by glass fibers, such as liquid crystal plastics (LCP), polyphenylene sulfide (PPS), polyether imide (PEI), polycarbonate (PC). In addition, the mirror 21 described above is obtained by forming a reflection film having a high reflection ratio, on a flat glass substrate. The movable coil 37 is obtained by winding a lead wire having a diameter of 0.05 mm into four layers, and lead lines 38 are respectively led from upper and lower portions thereof. Note that the power supply structure for supplying power to the movable coil 37 will be described later.

In addition, the plane shape of the spring assembly 30 described above is substantially rectangular as described above, and this spring assembly 30 is inserted in the cylindrical base member 22, thereby forming spaces on both sides of the spring assembly 30. Note that an engaging projecting portion 46 is formed on the back surface of the fixed member 31 of the spring assembly 30, as shown in FIG. 3. In correspondence with the engaging projecting portion 46 described above, an engaging concave portion 47 is formed at the upper edge portion of the circumferential wall portion of the base member 22 on the back surface side thereof. Further, the engaging projecting portion 46 is engaged into the engaging concave portion 47, and the spring assembly 30 is thereby positioned and engaged into the base member 22.

In the spaces on both sides of the spring assembly 30, fixed-side permanent magnets 39 each having a substantially rectangular block-like shape are respectively contained with their different poles opposed to each other. Those portions of the circumferential walls of the base member 32 that contain the permanent magnets 39 are formed on the flat surface portions 26 and are thus constructed so as to stably contain the permanent magnets 39.

The plane shape of the base member 22 is substantially circular, and the plane shape of each of the spring assembly 30 and the permanent magnets 39 is rectangular. Therefore, since these components are contained and engaged in the base member 22, clearances are respectively formed on the rear side of the permanent magnets 39. These clearances are used as clearances where a positioning pin of a fitting tool is inserted when the galvanomirror 20 is adjusted and mounted as will be described later.

Figure 5:
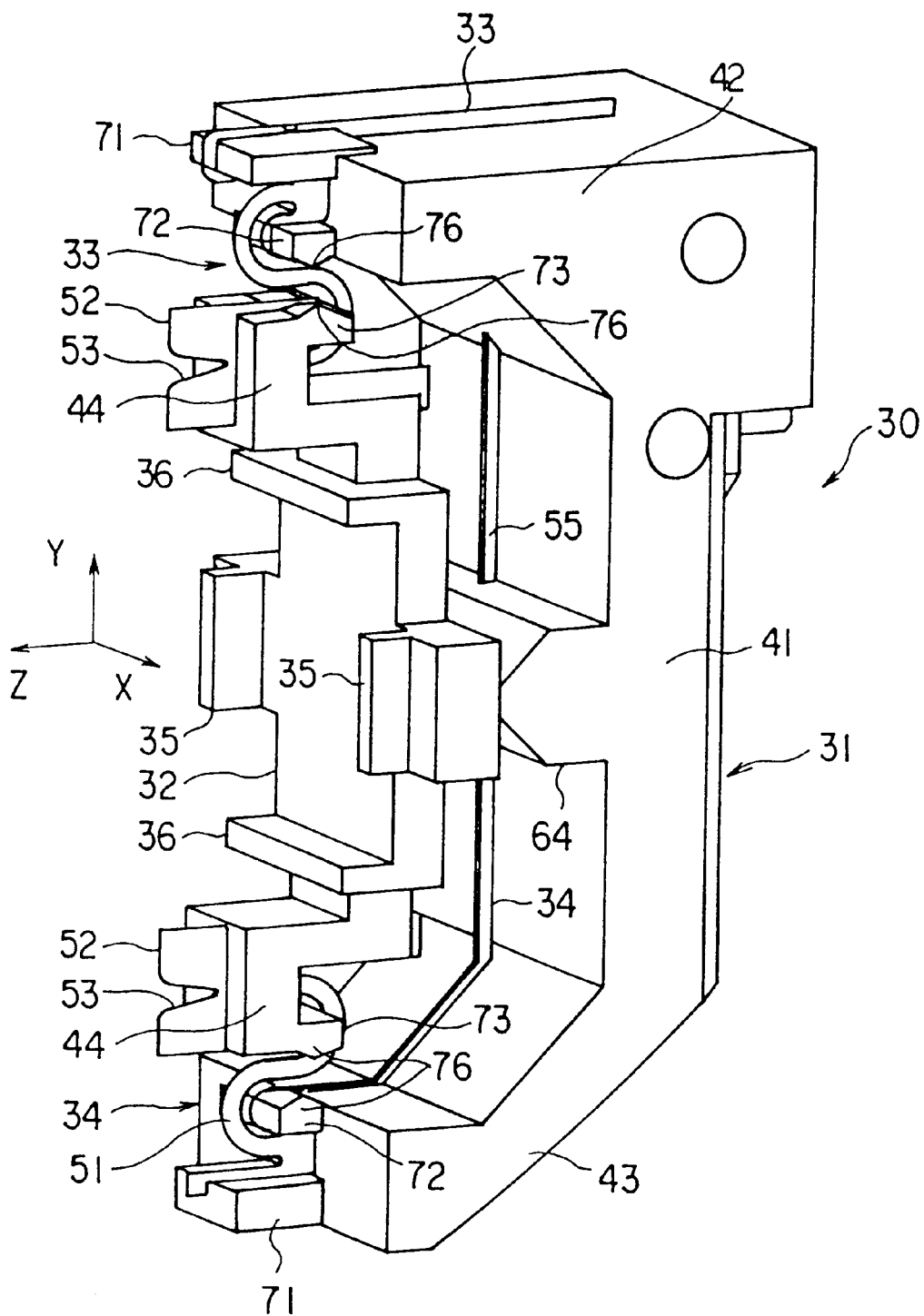
FIG. 5 is a perspective view of a spring assembly of the galvanomirror according to the embodiment.

Next, explanation will be made of the structure of the spring assembly 30. FIG. 5 is a perspective view of the spring assembly 30. The fixed member 31 described above has a beam-like beam portion 41 and arm portions 42 and 43 projecting from the upper and lower end portions of the beam portion 41. Spring attachment portions 44 are formed to be projected integrally from the upper and lower end portions of the movable member 32, respectively. The arm portion 42 and 43 and the spring attachment portions 44 are joined to be rotatable about the mirror rotation axis R described above. The joint structure of the springs 33, 34, the fixed member 31, and the movable member 32 is constructed as follows.

Figure 6:
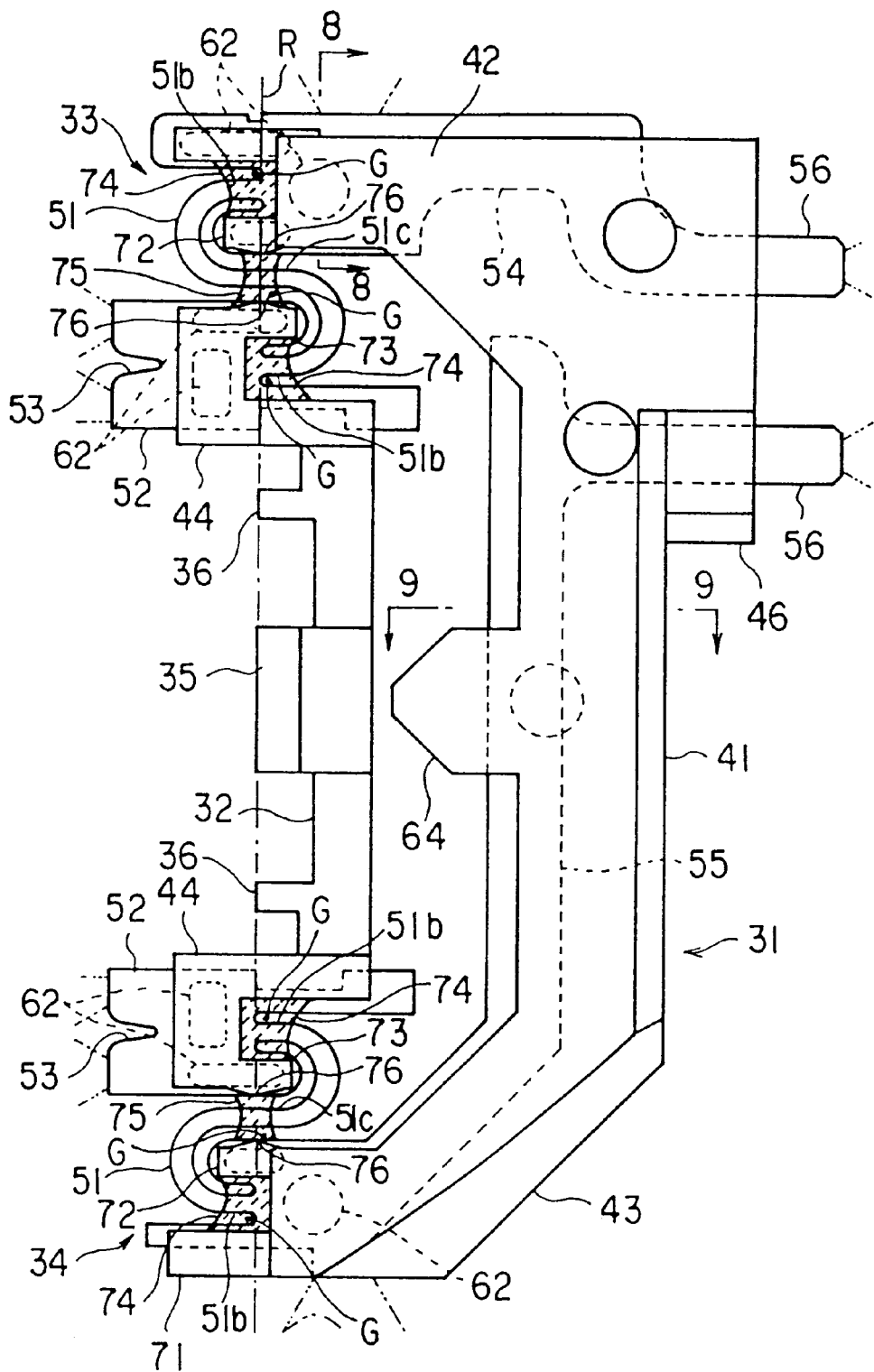
FIG. 6 is a schematic side view of the spring assembly of the galvanomirror according to the embodiment.

FIG. 6 shows the shapes of the springs 33 and 34 and the layout relationship between the fixed member 31 and the movable member 32. FIG. 7 shows a state of a rapped blank material before the springs 33 and 34 are incorporated in the fixed member 31 and movable member 32. These springs 33 and 34 serve as members for rotatably supporting the movable member 32, reinforcement members for reinforcing the fixed member 31 and the like, and conductive members for supplying power to the movable coil 37 described above.

These springs 33 and 34 are obtained by processing thin plate materials of, for example, beryllium-copper alloy having a thickness of 0.03 mm into predetermined shapes by etching or the like, and gold plating is performed with a thickness of 0.2 micron on the surfaces thereof to improve the corrosion resistant characteristic and soldering characteristic. Further, these springs 33 and 34 each include, for example, an S-shaped spring portion 51 curved in a S-shape, a terminal portion 52 formed to be continuous to an end portion of the S-shaped spring portion 51, reinforcement conductive portions 54 and 55 formed to be continuous to the other end portion of the S-shaped spring portion 51, and a terminal portion 56 formed at the top end portions of the reinforcement conductive portions 54 and 55. V-shaped engaging notches 53 engaged with a lead line 38 of the movable coil 37 stated above are respectively formed in the top end portions of the terminal portions 52 described above. The reinforcement conductive portion 55 of the lower spring 34 is formed to be substantially L-shaped.

The springs 33 and 34 are arranged in parallel with the Y-Z plane in FIGS. 2 and 5, and the terminal portion 52 and the reinforcement conductive portions 54 and 55 are embedded to be integral with the center surface and the symmetrical surface of the fixed member 31 and the movable member 32. The reinforcement conductive member 54 and 55 are metal plate materials and have high rigidity against bending and shearing deformation in the surface direction. Therefore, since these materials are embedded integrally in the beam portion 41 and the arm portions 42 and 43 in the fixed member 31, the rigidity of these parts is increased, thereby preventing deformation due to loads and deformation due to thermal expansion according to temperature changes, so that the precision of the spring assembly 31 is increased. In addition, since the terminal portion 52, the reinforcement conductive portions 54 and 55 and the like are embedded in the center planes of the fixed member 31 and the movable members 32, the spring assembly 30 is laterally symmetrical with respect to the center plane, so that irregular deformation is more efficiently prevented and the precision is more improved.

The terminal portion 52 of the upper spring 33 is integrally embedded in the spring attachment portion 44 on the upper side of the movable member 32, and the top end portion of the terminal portion 52 projects from the top end surface of the spring attachment portion 44. Further, one of the lead lines 38 of the movable coil 37 is engaged with the engaging notch 53 at the top end portion and further joined thereto by soldering. In addition, the reinforcement conductive portion 54 is integrally embedded in the upper arm portion 42 of the fixed member 31. Further, the terminal portion 56 at the top end of the reinforcement conductive portion 54 projects through the back surface of the fixed member 31, as shown in FIG. 3. Further, as shown in FIGS. 3 and 11, a terminal portion of a printed wiring board 60 is soldered to the terminal portion 54. Therefore, power is supplied to the movable coil 37 through the printed wiring board 60, the reinforcement conductive portion 54 of the spring 33, the S-shaped spring portion 51, the terminal portion 52, and the lead line 38.

In addition, as for the lower spring 34, the terminal portion 52 thereof is embedded in the spring attachment portion 44 on the lower side of the movable member 32, and the engaging notch 53 is engaged with and soldered to the other lead line 38 of the movable coil 37. In addition, the L-shaped reinforcement conductive portion 55 of this spring 34 is integrally embedded continuously in the lower arm portion 43 and beam portion 41 of the fixed member 31. Further, the terminal 56 at the top end of the reinforcement conductive portion 55 projects through the back surface portion of the fixed member 31 and is soldered to the other terminal portion of the printed wiring board 60, in a similar manner as described above. Also, in a similar manner as described above, power is supplied to the movable coil 37 through these components.

This kind of spring assembly 30 is assembled in the following manner. Firstly, a thin plate material of beryllium-copper alloy or the like as described above is processed by etching to manufacture a blank material 60 of a spring as shown in FIG. 7. This blank material 60 has a frame-like frame portion 61, and springs 33 and 34 as described above are integrally in the frame portion 61, with a predetermined layout relationship. Note that these springs 33 and 34 are continuous to the frame portion 61 along the portion of a cut plan line C along which cutting is carried out after assemble. Also, for example, at four corners of the frame portion 61, positioning holes 63 are respectively formed for positioning.

Further, this blank material 60 is interposed between a pair of metal molds (not shown) and these molds are matched each other. A resin material is injected into the cavity of these molds to form the fixed member 31 and movable member 32. At the same time, the portion of the springs 33 and 34 are integrally embedded in the center plane as a matching interface of the molds of the fixed member 31 and the movable member 32.

Note that the adhesive force between the resin material and the springs 33 and 34 is so small that the embedded springs 33 and 34 are not integrated and the fixed member 31 and the movable member 32 sometimes crack into the left and right sides at these portions. To prevent this, through holes 62 are formed in appropriate portions of the springs 33 and 34, and for example, as shown in FIG. 8, an injected resin material is filled into these holes so that the fixed member 31 and the left and right part of the movable members 32 are joined together and the springs 33 and 34 are integrated.

In addition, when injecting the resin material into the cavity of the metal molds, respective parts of the springs 33 and 34 are deformed in the cavity by the injection pressure thereof, and the respective parts of the springs 33 and 34 are shifted from the center or deformed, in some cases. To prevent this drawback, the appropriated portions of the springs 33 and 34, for example, the top end portion of the terminal portion 52, the edge portions of the reinforcement conductive portions 54 and 55, and the terminal portion 56 are clamped and pressed between the metal molds, thereby to prevent these portions from being shifted or deformed in the cavity. Accordingly, the portions clamped and pressed between the metal molds project from the surfaces of the fixed member 31 and the movable member 32, as shown in FIGS. 8 and 9.

Note that the reinforcement conductive portion 55 is embedded substantially over the whole length of the beam portion 41 of the fixed member 31, and the edge portion thereof projects substantially over the whole length of the beam portion 41. Therefore, at the embedded portion where the reinforcement conductive portion 55 is embedded, the beam portion 41 is divided into left and right parts, and the strength and rigidity thereof are deteriorated. To prevent this drawback, through holes as described above are formed in the reinforcement conductive portion 55 and the left and right parts of the beam portion may be joined by the resin material filled in the through holes. However, if these through holes are formed, the strength and rigidity of the reinforcement conductive portion 55 are deteriorated. Therefore, at the center portion of the beam portion 41, a connection rib portion 64 is integrally projected in the direction crossing the beam portion. This connection rib portion 64 connects the left and right parts of the beam portion 41 together over the projecting edge portion of the reinforcement conductive portion 55. Therefore, the left and right parts of the beam 41 can be connected without forming through holes in the reinforcement conductive portion 55.

The connection rib portion 64 is opposed to the back surface of the movable member 32 and also serves as a stopper which restricts the maximum rotation angle of the movable member 32.

Further, after these springs 33 and 34 are integrally embedded in the fixed member 31 and the movable member 32, the portion of the cut plan line C is cut, and the springs 33 and 34 are separated from the frame portion 61. The spring assembly 30 is thus completed.

Next, the S-shaped spring portions 51 will be explained. These S-shaped spring portions 51 are arranged in parallel with the Y-Z plane in FIGS. 2 and 5 as described above, and support the movable member 32 to be rotatable about the mirror rotation axis R parallel to the Y-axis in FIGS. 2 and 5. The S-shaped spring portion 51 also function as a support member to prevent the movement of the movable member 32 as much as possible in directions other than that axis.

Figure 10:
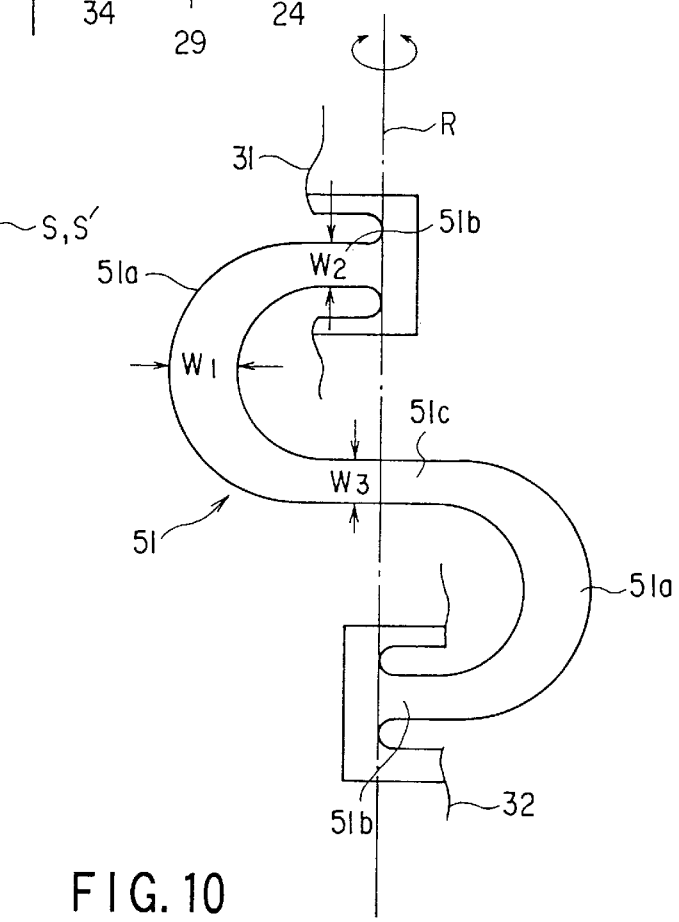
FIG. 10 is a schematic side view of an S-shaped spring port of a spring.

FIG. 10 shows an enlarged view of the S-shaped spring portion 51, and a pair of substantially semicircular curve portions 51a, end portions 51b thereof, and a substantially linear portion 51c which connects the other end portions of the curve portions 51a are integrally formed. Further, the end portions 51b described above are fixed to the side of fixed member 31 and to the side of the movable member 32.

The S-shaped spring portions 51 utilizes the deformation characteristic of a thin plate to achieve the function as a support member as described above. In general, a thin plate material has the smallest rigidity with respect to simple bending deformation in the direction perpendicular to the surface direction, certainly high rigidity with respect to twisting deformation, and has the highest rigidity with respect to bending deformation or shearing deformation along the surface directions. When the movable member 32 is rotated about the mirror rotation axis R in relation to the fixed member 31, simple bending deformation in the direction perpendicular to the surface direction is caused in the portion close to the mirror rotation axis R which means the base end portions of the end portions 51b and the central portion of the linear portion 51c of the S-shaped spring portion 51 although twisting deformation is caused at the portion apart from the axis R so that the twisting deformation becomes larger as the portions are more apart from the axis R. Consequently, simple bending deformation occurs, concentrating at the portions close to the axis R, and the deformation amount is small at the portions apart from the axis R. Besides, the entire deformation of the S-shaped spring portion 51 is symmetrical to the axis R as the center. Therefore, the S-shaped spring portion 51 supports the movable member 32 so as to rotate about the mirror rotation axis R, so that the elastic force caused by the rotation about the mirror rotation axis is small.

Meanwhile, when the movable member 32 is moved to be inclined about the Y-axis direction, Z-axis direction, and X-axis direction, bending deformation and shearing deformation in the surface direction occur in the S-shaped spring portion 51. The S-shaped spring portion 51 has high rigidity with respect to bending deformation and shearing deformation in the surface direction, as described above, and therefore, the supporting rigidity of the movable member 32 is high with respect to these directions. In particular, although movement in the Z-axis direction and inclination about the X-axis cause optical errors such as a displacement of the light focus point of light reflected by the mirror 21 attached to the movable member 32 and an inclination of the optical axis, the supporting rigidity in these directions is high as described above so that these optical errors can be excluded effectively.

When the movable member 32 is moved in the direction of the X-axis and when it is inclined about the Z-axis, twisting deformation occurs at the end portions 51b and the linear portion 51c of the S-shaped spring portion 51 and simple bending deformation occurs at the center portions of the bending portions 51a, so that the rigidity is lowered relatively. The movement in these directions is simply a movement of the mirror 21 in the direction parallel to the reflection surface thereof and does not cause a substantial displacement of the reflection surface. Therefore, no optical error occurs.

Further, the S-shaped spring portion 51 is formed in a shape as described below in order that movement in the Z-axis direction, inclination about the X-axis which are factors of an optical error are reduced as much as possible, i.e., that the bending deformation and shearing deformation of the S-shaped spring 51 in the surface direction are reduced as much as possible. As shown in FIG. 10, the S-shaped spring portion 51 is arranged such that the widths $W_2$ and $W_3$ of the end portions 51b and the linear portion 51c are narrow while the width $W_1$ of the curve portions 51a is wide. For example, in this embodiment, the width $W_2$ and $W_3$ of the end portions 51b and the linear portion 51c are each set to 0.08 mm and the width $W_1$ of the curve portions 51a is set to 0.16 mm.

To increase the rigidity of the S-shaped spring portion 51 against bending deformation and shearing deformation in the surface direction, the widths of respective portions of the S-shaped spring portion 51 may be widened. However, if the widths are uniformly widened, the rigidity of the end portions 51b and the linear portion 51c against simple bending in the direction perpendicular to the surface direction is increased so that the rigidity against deformation about the mirror rotation axis R is increased. However, if the width $W_1$ of the curve portion 51a is widened as described above, the rigidity of the end portions 51b and the linear portion 51c against simple bending deformation in the direction perpendicular to the surface direction is substantially unchanged but the rigidity of the curve portions 51a against bending deformation and shearing deformation in the surface direction thereof is increased, therefore the rigidity of S-shaped spring portion 51 against bending deformation and shearing deformation in the surface direction is increased. Meanwhile, when deformation about the mirror rotation axis R occur as described above, the end portions 51b and the linear portion 51c close to the mirror rotation axis R are mainly curved and deformed while deformation is small at the curve portion 51a positioned apart from the axis R. Accordingly, the increase of the rigidity about the mirror rotation axis R is slight in this case.

Since the S-shaped spring portion 51 described above functions as a member which ensures rotatably supporting about the mirror rotation axis R, it is preferred for the characteristic of this portion that the rigidity $G_Z$ against deformation in the other direction which is the Z-axis direction in FIG. 5 is larger than the rigidity $G_R$ against deformation about the axis R, i.e., $G_Z/G_R$ is as large as possible.

Next, explanation will be made of results of a test conducted to confirm the result as described above. In this case, since the above S-shaped spring portion 51 has a small size, it is difficult and inaccurate to measure directly the rigidity in the respective directions of the S-shaped spring portion 51. Taking into consideration this condition, the ratio of rigidity of $G_Z/G_R$ described above was indirectly measured in the following manner.

Firstly, as a comparative example, a spring having a plate thickness of 0.03 mm and a uniform width of 0.08 mm over the entire S-shaped spring portion was prepared, and a spring according to the embodiment as described above in which the end portions 51b and the linear portion 51c each had a width of 0.08 mm and the width $W_1$ of the curve portion 51a was 0.16 mm was prepared. These springs were integrated with same fixed members 31 and same movable members 32, and thus, spring assembles 30 were prepared.

Further, natural frequencies of the movable member 32 in respective directions were measured. First, with respect to the comparative example having a uniform width, the natural frequency $f_R$ of the movable member 32 about the mirror rotation axis R and the natural frequency $f_Z$ of the movable member 32 in the Z-axis direction were measured, and as a result, $f_R$=128 Hz and $f_Z$=718 Hz were obtained. Meanwhile, the natural frequencies were measured likewise with respect to the spring according to the embodiment, and as a result, $f_R$=159 Hz and $f_Z$=1414 Hz were obtained. Further, as a result of calculating the ratios of them, the comparative example having a uniform width had $f_Z/f_R$ of 5.6 while the spring according to the present embodiment had $f_Z/f_R$ of 8.9. Further, since the ratio of rigidity of the S-shaped spring portion is $(f_Z/f_R)^2$, the comparative example described above had $(f_Z/f_R)^2$ of about 31, i.e., the ratio $G_Z/G_R$ of the rigidity about the mirror rotation axis and the rigidity in the Z-axis direction was about 31. In contrast, the spring according to the present embodiment had $G_Z/G_R$ of about 79.

Accordingly, the $G_Z/G_R$ of the spring according to the present embodiment was as about 2.6 times high as that of the comparative example. Therefore, in the spring according to the present embodiment, the rigidity $G_Z$ in the Z-axis direction is about 2.6 higher than the comparative example if the rigidity $G_R$ about the mirror rotation axis R is set to be equal to that of the comparative example. That is, for example, the amount by which the movable portion 32 is moved due to resonance or oscillation is 1/2.6, i.e., the displacement of light reflected by the mirror 21 is 1/2.6. It is thus possible to obtain a galvanomirror with high accuracy and a stable tracking characteristics.

Also, as a form of the support member described above, the S-shaped spring 51 as described above is used. As for the spring as a support member for the galvanomirror 20, the effective length of the spring is preferable long in order to reduce the power consumption and the maximum stress which occurs at the support member thereby to improve the reliability of the support member. However, if it is elongated in the support member mirror rotation axis direction, the size of the galvanomirror 20 is very large and hinders downsizing of the apparatus. Therefore, in the present embodiment, the spring as a support member is formed in a S-shaped and the spring length between the end portions 51b and 51b of the spring is elongated while the linear distance between the two end portions 51b and 51b.

Further, in the present embodiment, installation of the end portion 51b onto the fixed member 31 and installation of the end portion 51b to the movable member 32 are situated in the Z-direction as a direction vertical to the direction of the mirror rotation axis R. Therefore, the dimension in the mirror rotation axis R direction can be arranged to be very small including the attachment portion for the S-shaped spring 51 as a support member. Therefore, the reliability can be improved by reducing the dimensions of the galvanomirror 20 in the mirror rotation axis R direction to reduce the power consumption and to reduce the maximum stress generated at the support member.

In addition, the movable member 32 is supported to be rotatable about the mirror rotation axis R by deformation of the S-shaped spring portions 51 of the springs 33 and 34. Since the S-shaped spring portion 51 has a predetermined spring constant with respect to deformation about the mirror rotation axis R, the movable member 32 oscillates about the mirror rotation axis R. Further, to damp such oscillation of the movable member 32, there is provided a damping mechanism as follows.

That is, as shown in FIGS. 5 to 6, upper and lower pairs of projecting portions 71 and 72 are respectively provided at the top end portions of the arm portions 42 and 43 of the fixed member 31, such that one end portion 51b of each spring portion 51 of the springs 33 and 34 is surrounded thereby. In addition, the spring attachment portions 44 of the movable member 32 are respectively provided with projecting portions 73, and the spring attachment portions 44 are formed like a U-shape such that the other end portions 51b of the S-shaped spring portions 51 are surrounded thereby. In addition, by the projecting portions 72 and 73 described above, the linear portion 51c of the S-shaped spring portion 51 is surrounded thereby.

Further, the concave portion formed between the projecting portions 71 and 72 and the clearance between the projecting portions 72 and 73 are filled with damping materials 74 and 75, respectively. The end portions 51b of the S-shaped spring portions 51 are embedded in the damping materials 74, and the linear portion 51c of the S-shaped spring portion 51 is embedded in the damping material 75 described above. These damping materials 74 and 75 are, for example, obtained in a manner in which predetermined amounts of thermosetting silicon gel material having fluidity in an unhardened liquid state area injected and held in the concave portions and the clearance, and the spring assembly 30 is thereafter heated in an oven, for example, at 70° C. for 30 minutes, so that the unhardened gel material is hardened to form silicon gel material having a predetermined viscosity.

Accordingly, if the movable member 32 is rotated about the mirror rotation axis R, the end portions 51b and the linear portion 51c of the S-shaped spring portion 51 are deformed in the damping materials 74 and 75 thereby generating a predetermined damping force due to the viscosity resistance, so that the oscillation of the movable member 32 is damped.

When the unhardened damping materials 74 and 75 are injected and held, cohesion is effected such that the free surfaces are minimized by the surface tension. Accordingly, the liquid lump of the unhardened damping material 74 is held at a deep portion in the concave portion formed between a pair of projecting portions 71 and 72 and is held at a predetermined position with the end portion 51b embedded at the center portion. In addition, the liquid lump of the unhardened damping material 75 is held between the projecting portions 72 and 73 and is held such that the linear portion 51c of the S-shaped spring portion 51 is embedded in the center thereof.

However, if the surfaces of the projecting portions 72 and 73 opposed to each other are parallel planes, the cross-sectional shape of the linear portion 51c is constant in the Z-axis direction and the free surface thereof does not change even when the liquid lump of the damping material 75 is moved in the lateral direction in FIG. 6, i.e., in the Z-direction in FIG. 5. Therefore, the liquid lump of the damping material 75 is movable to an arbitrary position in the Z-direction, and the holding position thereof is not constant. To prevent this drawback, in the present embodiment, convex portions 76, each of which continues in the X-axis direction and has a convex cross-section, are formed respectively on the surfaces of the projecting portions 72 and 73 which are opposed to each other. Accordingly, when the liquid lump of the damping material 75 moves in the Z-axis direction, a difference appears between the areas of the free surfaces on both sides, and the liquid lump moves to a position where the surface tensions of the free surfaces on both sides are balanced, i.e. ,the liquid lump moves at symmetrical position to the Z axis for the convex portion 76. The liquid lump is held stably at this position. Therefore, it is possible to accurately hold the damping material 75 at a predetermined position.

Note that as the damping materials 74 and 75, it is possible to use arbitrary material having a damping characteristics, such as an ultraviolet-hardening silicon gel, acrylic gel, butyl rubber liquidized by a solvent, acrylic adhesive material, or the like, other than the materials described above.

Next, explanation will be made of operation of an installation apparatus for attaching the galvanomirror 20 constructed as described above into the galvanomirror container section 28 of the carriage 2 and for installing the mirror at a predetermined position by adjusting the inclination thereof or the like, with reference to FIGS. 11 and 12.

Firstly, as described above, the spherical support surface 24 formed on the bottom surface of the base 22 of the galvanomirror 20 has a center axis S which is parallel to the mirror rotation axis R is included in the reflection surface of the mirror 21. In addition, the center point of the spherical surface of the support surface 24 corresponds to the position O of the optical axis of the entering light on the reflection surface of the mirror 21. Also, the bearing seat surface 29 in form of a conical surface formed at the bottom portion of the galvanomirror container portion 28 of the carriage 2 has a center axis S', which is parallel to the mirror rotation axis R, is included in the reflection surface of the mirror 21, and passes through the position O of the optical axis of the entering light on the reflection surface of the mirror 21.

Further, as shown in FIG. 12, the galvanomirror 20 is held by a fitting tool 80. This fitting tool 80 has a lower end portion having an inverted U-shape, and for example, four positioning pins 81 are projected from the load bearing portions of the tool. In addition, an electromagnet (not shown) is included in the fitting tool 80.

This kind of fitting tool 80 is engaged closely with the galvanomirror 20 from upside, and the electromagnet is excited thereby to magnetically attach and hold the galvanomirror 20. In this case, the positioning pins 81 are inserted in the gaps formed in the rear side of the permanent magnets 39 of the galvanomirror 20 and in the front side thereof, and the front and rear sides of the permanent magnets 39 are clamped and held between the positioning pins 81. In this manner, the galvanomirror 20 is held positioned at a predetermined position with respect to the fitting tool 80.

Next, the galvanomirror 20 held by the fitting tool 80 is inserted into the galvanomirror container portion 28 from an upper end opening portion thereof. The inserting direction is a direction parallel to the mirror rotation axis R, i.e., the direction parallel to the center axis S of the support surface 24 and the center axis S' of the bearing seat surface 29. The galvanomirror 20 thus inserted is situated such that the support surface 24 is seated on the bearing seat surface 29 and the center axes S and S' correspond to each other.

In this state, the galvanomirror 20 is pressed downward with a predetermined pressure force of, for example, about 100 gf by a fitting tool 80 and the support surface 24 is kept in contact with the bearing seat surface 29. While making them slide on each other, the inclination of the galvanomirror 20 is inclined, for example, rotated about the mirror rotation axis R, i.e., about the Y-axis and the X-axis, thereby to adjust the inclination thereof about two axes parallel to the reflection surface of the mirror 21 with respect to the optical axis of the optical system. Note that this adjustment is carried out by applying light from the laser diode 11 onto the mirror 21 of the galvanomirror 20, by detecting the inclination of light emitted from the fixed mirror 16 with respect to the reference surface of the carriage 2 by means of an auto-collimator, and by automatically controlling the inclination of the fitting tool 80 by means of a control device (not shown) or the like.

Further, after the adjustment service as to the inclination as described above is completed, the galvanomirror 20 is maintained at that position, and an adhesive agent A is injected and hardened between the galvanomirror 20 and the inner surface of the galvanomirror container section 28, e.g., between the front edge portion and both side surface portions of the base member 22 and the inner surface of the galvanomirror container section 28, or between the support surface 24 and the bearing seat surface 29. The galvanomirror 20 is thereby fixed at a predetermined installation position with respect to the carriage 2. Further, thereafter, the fitting tool 80 is pulled cut upward.

As described above, in this embodiment, the center axis S of the supporting surface 24 of the galvanomirror 20 is in the direction parallel to the reflection surface of the mirror 21, such as the direction parallel to the mirror rotation axis R. Moreover, the galvanomirror container section 28 on the carriage 2 side is opened in the direction parallel to the reflection surface of the mirror and, further, opened in the direction parallel to the mirror rotation axis R. The center axis S' of the bearing seat surface 29 is parallel to the reflection surface of the mirror 21 and also parallel to the mirror rotation axis R.

Therefore, only by inserting the galvanomirror 21 into the galvanomirror container section 28 from the direction parallel to the reflection surface of the mirror 21 and parallel to the mirror rotation axis R, that is, from the direction perpendicular to or crossing the optical path, the supporting surface 24 can abut on the bearing seat surface 29. In this state, if these surfaces are slid, then the inclination of the galvanomirror 20 in two directions can be adjusted. Thus, adjustment and mounting operation can be made easier.

Also, the opening direction of the galvanomirror container section 28 is parallel to the center axis S' of the bearing seat surface 29. Due to this, if the fixed member such as the carriage 2 is manufactured by die-casting, the center axis S' of the bearing seat surface 29 corresponds to the leaving direction of the metal mold. Thus, the bearing seat surface 29 can be formed integrally with the carriage 2. In processing the bearing seat surface 29, the surface 29 can be easily mechanically processed by inserting a cutting tool from the opening, thereby greatly facilitating manufacture of the fixed member. In addition, since the supporting surface 24 of the galvanomirror 20 can directly abut on the bearing seat surface 29 which has been directly formed on the carriage 2 side, the mounting structure for mounting the galvanomirror can be made simple and smaller, thereby allowing the optical device such as the light pick-up apparatus, to be made smaller. In addition, even if the carriage of this type is manufactured out of a plastic molded article, the bearing seat surface 29 can be formed easily as in the case of the above.

In this embodiment, the center axis S of the supporting surface 24 on the galvanomirror 20 side is parallel to the mirror rotation axis R, which axis R corresponds to the center axis of the assembly of the galvanomirror 20. Owing to this, only by inserting the galvanomirror 20 in the center axis direction, the supporting surface 24 can be seated on the bearing seat surface 29, thus further facilitating adjustment and mounting operation.

Further, the center axis S' of the bearing seat surface 29 is included in the reflection surface of the mirror 21 of the galvanomirror 20. Due to this, even if the galvanomirror 20 is rotated about this center axis S' to adjust its inclination, the reflection surface of the mirror 21 is prevented from being moved in the Z-axis direction, i.e., the direction in which optical errors may occur, thereby facilitating adjusting and mounting operation.

In addition, the center of the sphere of the supporting surface 24 corresponds to the position of the optical axis of the entering light on the reflection surface of the mirror 21. Due to this, even if the inclination of the galvanomirror 20 is adjusted in an arbitrary direction, the reflection surface at the position of the optical axis of the entering light does not move in the Z-axis direction, thereby considerably facilitating adjustment and mounting operation.

Moreover, in this embodiment, since the galvanomirror 20 is fixed to the carriage 2 with the adhesive agent A without using other fixing components such as a screw and a spring, the structure is simple, thereby making it possible to provide a far smaller apparatus.

Furthermore, the galvanomirror 20 in this embodiment has the spring assembly 30, the permanent magnet 39 and the like contained in the cylindrical base member 22 having a bottom. The supporting surface 24 is formed at the bottom of the base member 22. Part of the circumferential wall portion of the base member 22 is cut to form the light path opening 25. The supporting surface 24 is structured to surround the mirror 21. Thus, the overall galvanomirror 20 can be made compact and smaller.

It is noted that the present invention should not be limited to the above embodiment. For instance, the mirror rotation axis direction of the galvanomirror 20 may not be parallel to the supporting surface. The mirror rotation axis may be, for example, parallel to the X-axis in the above embodiment. In this case, the supporting surface 24 of the galvanomirror 20 may be structured to be formed around the flat surface portion 26.

Additionally, in the above embodiment, the supporting surface of the base member is formed into a part of a sphere and the bearing seat surface of the fixed member which receives the supporting surface is formed into a conical shape. Each of them may be formed into arbitrary shape as long as they are designed to incline the mirror. For instance, both the supporting surface and the bearing seat surface may be spherical. The supporting surface may consists of three points and the bearing seat surface may be spherical. The supporting surface may be annular and the bearing seat surface may be spherical. Furthermore, shapes of the supporting surface and the bearing seat surface may be an arbitrary combination of spherical shape, conical shape, three-point supporting shape, annular shape and the like.

Further, the above-stated supporting surface is not necessarily formed at the bottom of the galvanomirror. Directions of the center axis of the supporting surface, the center axis of the bearing seat surface and the opening of the galvanomirror container section may not necessarily be limited to the direction parallel to the mirror rotation axis. Those directions can be appropriately set in accordance with various conditions such as the housing structure of the optical device and the layout of the optical components.

For instance, the galvanomirror container section may be opened downward, the supporting surface may be formed on the upper portion of the galvanomirror and the galvanomirror may be inserted from the downward direction. Also, the galvanomirror container section may be opened to the side surface, e.g., in a plane including optical axis of entering light and outgoing light in the direction crossing the optical axes, the supporting surface may be formed on the side portion of the galvanomirror and the mirror may be inserted from the side direction. Any of these directions is parallel to the reflection surface of the galvanomirror. Thus, the supporting surface may be formed on a portion of the base member in the direction parallel to the reflection surface of the mirror.

Moreover, the galvanomirror driving method should not be limited to that in the above embodiment. For instance, a moving magnet method in which a magnet is arranged at the movable section and a coil is arranged on the base side may be adopted. The galvanomirror may not be electromagnetically driven, but driven by a piezoelectric device or electrostatically driven. Besides, the galvanomirror supporting method should not be limited to that using a metal spring. The galvanomirror may be supported by an elastic member such as a wire and resin. The silicon substrate may be etched to thereby form a mirror and a supporting spring integrally.

The structure of the galvanomirror should not be necessarily limited to that in the above embodiment. Various types of structures can be actually adopted according to various specifications. In addition, means for fixing this galvanomirror to the fixed member such as a carriage should not be necessarily limited to an adhesive material. The galvanomirror can be fixed by pressing the mirror using a screw, caulking or a spring member, or by other fixing means.

Furthermore, the galvanomirror should not be limited to that provided with a flat surface type mirror and may be designed to rotate or tilt an optical device such as a concave mirror, a hologram and a prism. The type and structure of the galvanomirror should not be limited to a certain type and a structure.

As stated so far, according to the galvanomirror adjusting and mounting apparatus, the supporting surface on the galvanomirror side is formed at a position of the base member in the direction parallel to the reflection surface of the mirror, the galvanomirror container section on the fixed member side is opened in the direction parallel to the reflection surface of the mirror, and the center axes of the supporting surface and of the bearing seat surface are parallel to the reflection surface of the mirror. Thus, only by inserting the galvanomirror in the galvanomirror container section from the direction of the reflection surface of the mirror, the supporting surface can directly abut on the bearing seat surface, thereby facilitating adjustment and mounting operation. In addition, the structure of the galvanomirror can be simplified, the number of parts can be reduced and the mirror can be made smaller. In addition, since the direction of the center axis of the bearing seat surface corresponds to the opening direction, great advantages can be obtained such as facilitating the fabrication of the bearing seat surface.

It is noted that a person in the art can add other improvements or modifications hitherto than described above. Therefore, more broadened embodiments of the present invention are not limited to the embodiment described above. Accordingly, various modifications can be made without deviating from the basic subject or concept of the present invention by the claims.

I claim:

1. A galvanomirror mounting apparatus for fixing a galvanomirror, said galvanomirror comprising a base member, a movable section rotatably supported about a mirror rotation axis with respect to the base member and having at least a mirror and drive means for rotating the movable section, to a fixed member by adjusting an inclination in at least two directions about the axis, parallel to a reflection surface of said mirror and perpendicular to each other, wherein a supporting surface having a center axis parallel to the reflection surface of said mirror is provided on a bottom of the base member, an upper or side surface of the base member positioned in a direction parallel to the reflection surface of said mirror;

a galvanomirror container section opened toward a direction parallel to the reflection surface of said mirror and containing said galvanomirror is provided at said fixed member;

a bearing seat surface having a center axis parallel to the reflection surface of said mirror is provided in the galvanomirror container section; and said galvanomirror mounting apparatus comprises galvanomirror fixing means for fixing the galvanomirror while the supporting surface of the base member of said galvanomirror abuts on the bearing seat surface of said galvanomirror container section.

2. The galvanomirror mounting apparatus according to claim 1, wherein the center axis of said supporting surface is parallel to said mirror rotation axis.

3. The galvanomirror mounting apparatus according to claim 1, wherein the center axis of said supporting surface is included in the reflection surface of said mirror and parallel to said mirror rotation axis.

4. The galvanomirror mounting apparatus according to claim 1, wherein a center of an inclination of supporting surface corresponds to a position of an optical axis of entering light on the reflection surface of said mirror.

5. The galvanomirror mounting apparatus according to claim 1, wherein said galvanomirror fixing means is an adhesive material fixedly attaching said base member to the fixed member.

6. The galvanomirror mounting apparatus according to claim 1, wherein said galvanomirror comprises a movable coil provided at said movable section, a cantilever-like supporting member rotatably supporting said movable section and a pair of fixed magnets arranged on both sides of the movable section;

said base member is a cylindrical member having a bottom, said base member having an upper end portion opened and a bottom wall portion at the bottom;

a yoke member and the pair of fixed magnets are inserted into and fixed to the cylindrical base member having the bottom in predetermined arrangement;

a portion of a circumferential wall portion of the base member corresponding to the front side of said mirror is cut to thereby form an optical path opening; and a cylindrical supporting surface having a center axis parallel to said mirror rotation axis is provided on a lower surface of said bottom wall portion.

* * * * *